3,458,628
ACOVENOSIDE DERIVATIVES
Fritz Kaiser, Lampertheim, Hesse, Wolfgang Schaumann, Mannheim-Waldhof, and Wolfgang Voigtlander, Burstadt, Hesse, Germany, assignors to C. F. Boehringer & Soehne GmbH, a corporation of Germany
No Drawing. Filed Dec. 20, 1966, Ser. No. 603,182
Claims priority, application Great Britain, Feb. 11, 1966, 6,278/66
Int. Cl. C07c *173/02;* A61k *27/00*
U.S. Cl. 424—182          21 Claims

ABSTRACT OF THE DISCLOSURE

Acovenoside derivatives having the formula:

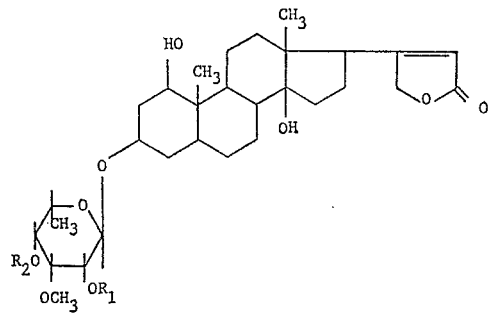

wherein $R_1$ and $R_2$ are selected from the group of hydrogen and acyl containing from 1–7 carbon atoms with the proviso that only one of $R_1$ and $R_2$ can be hydrogen. With the exception of the compound where $R_1$ and $R_2$ are both acetyl, all of the compounds falling within the above formula are novel. The compounds of the invention are therapeutic agents for use in the treatment of cardiac conditions.

---

The instant invention relates to acovenoside derivatives of the formula

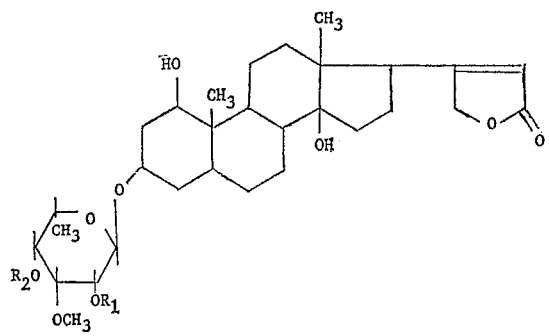

wherein $R_1$ and $R_2$ are selected from the group of hydrogen and acyl containing from 1–7 carbon atoms with the proviso that only one of $R_1$ and $R_2$ can be hydrogen. With the exception of the compound where $R_1$ and $R_2$ are both acetyl, all of the compounds falling within the above formula are novel. The compounds of the invention are therapeutic agents for use in the treatment of cardiac conditions. In particular, they are useful in the treatment of cardiac decompensation acting to improve the circulation and reduce edema. The invention includes the therapeutic compositions containing the acovenoside derivative as well as the method for using them.

The instant invention relates to derivatives of acovenoside A, to new pharmaceutical compositions containing the same, as active ingredient, and is also concerned with the method of using said derivatives of acovenoside A.

The derivatives of acovenoside A according to the present invention are compounds of the formula

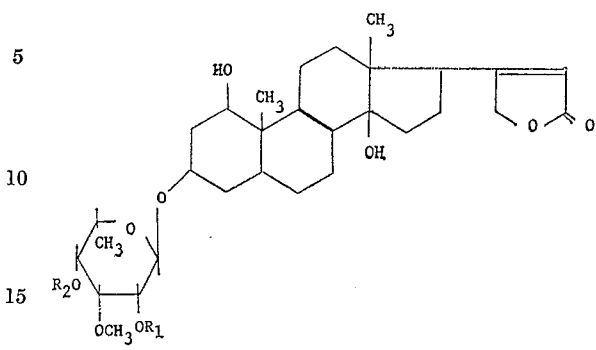

wherein $R_1$ and $R_2$, which may be the same or different, are each an aliphatic or aromatic acyl radical containing from 1–7 carbon atoms, which may be substituted by halogen atoms or by alkoxy, alkenoxy, aryloxy groups, and wherein one of the two radicals $R_1$ and $R_2$ can also be a hydrogen atom.

All the compounds having the above formula I are new with the exception of 2′,4′-diacetyl-acovenoside A, i.e., the compound in which $R_1$ and $R_2$ are both acetyl radicals.

When acovenoside A is administered intravenously to animals and also to humans, the acovenoside A demonstrates a very strong cardiac action which is comparable with that of strophantin but, when administered orally, it is only very slightly effective. The acovenoside A acetylated in the genin on the $C_2$-hydroxyl group (acovenoside B) also is only slightly effective when administered intravenously.

It has now, in accordance with the invention, been surprisingly found that acyl glycosides of Formula I, as set out above, are characterized by good resorption and enteric effectiveness and, therefore, can be administered orally in the therapy of cardiac insufficiency.

In the case of the first reports of the isolation of acovenoside A by J. v. Euw and T. Reichstein (Helvetia chim. Acta, 33, 485/1950), acovenoside A was already acetylated. However, the acetyl determination of the product thereby obtained gave a considerably higher value than was to have been assumed for a diacetate. As is readily apparent from the rotation and the analytical values provided, these authors only obtained a mixture, which consisted in the main of the triacetate. According to the present invention, there is now provided, for the first time, pure 2′,4′-diacetyl-acovenoside. By carrying out the acetylation of acovenoside A very carefully at room temperature and in an inert solvent, as for example dimethyl formamide, with acetic anhydride in the presence of a tertiary amine, there is obtained a mixture of mono- and diacetyl-acovenoside A which can be separated in the conventional manner, for example, by multiplicative distribution, chromatagraphic fractionation or fractional crystallization.

In the preparation of the other acyl derivatives of acovenoside A according to the present invention, the acylation is also carried out as carefully as possible in order to avoid acylation of the secondary hydroxyl group in the steroid skeleton.

It is to be understood that when the tertiary amine used in the reaction is a liquid, for example, pyridine, then the use of an additional inert solvent is unnecessary. Further examples of acylation agents which can be advantageously employed in the synthesis include acid chlorides in pyridine or the free acids and p-toluene-sulphochloride in pyridine or reactive esters of acids.

The following examples are given to illustrate the invention:

EXAMPLE 1

2 g. acovenoside A, dissolved in 30 ml. pyridine, were mixed with 3 g. p-chlorobenzoyl chloride, allowed to stand for 15 minutes at room temperature, diluted with water, extracted with chloroform, evaporated in a vacuum and, dissolved in benzene-ethyl acetate (5%), and fractionated over silica gel with benzene-ethyl acetate (5–50%). The benzene-ethyl acetate (25–40%) fractions yielded, after crystallization from chloroform-ether, 1.42 g. 2'-mono-(p-chlorobenzoyl)-acovenoside A having a melting point of 152–155° C.

EXAMPLE 2

2 g. acovenoside A, dissolved in 10 ml. pyridine, were mixed with stirring with 50 ml. formic acid-acetic acid anhydride (1:1) in the course of 1 hour. Thereafter, the reaction mixture was diluted with water, extracted with chloroform and evaporated in a vacuum. After crystallization from chloroform-ether, there were obtained 1.68 g. 2',4'-diformyl-acovenoside A having a melting point of 212–214° C.

EXAMPLE 3

2 g. acovenoside A in 20 ml. pyridine, cooled in ice, were added to an ice-cooled mixture of 900 mg. α-chloropropionic acid and 3 g. p-toluene-sulphochloride in 20 ml. pyridine, allowed to stand for 60 minutes with ice cooling, diluted with 200 ml. water, extracted with chloroform and evaporated in a vacuum. The crude product was dissolved in benzene-ethyl acetate (10%) and fractionated over silica gel with benzene-ethyl acetate (10–50%). The benzene-ethyl acetate (15–25%) fractions yielded, after crystallization from chloroform-ether, 1.36 g. of 2',4'-di-(α-chloropropionyl)-acovenoside A having a melting point of 124–126° C.

EXAMPLE 4

2 g. acovenoside A in 20 ml. pyridine were reacted with 700 mg. α,α-dichloropropionic acid and 2.5 g. p-toluene-sulphochloride in 20 ml. pyridine following the procedure described in Example 3 and then worked up in the same manner. Following crystallization from chloroform-ether, there were obtained 940 mg. 2'-mono(α,α-dichloropropionyl)-acovenoside A having a melting point of 136–138° C.

EXAMPLE 5

2 g. acovenoside A in 20 ml. pyridine were created with 1.6 g. ethoxy-acetic acid and 6 g. p-toluene-sulphochloride in 40 ml. pyridine in the manner described in Example 3 and also worked up in the same manner. After crystallization from chloroform-ether-petroleum ether, there were obtained 1.46 g. 2',4'-di-(ethoxy-acetyl)-acovenoside A having a melting point of 101–103° C. 1 g. of this product and 800 mg. potassium bicarbonate are dissolved in 150 ml. methanol and some water, after 30 minutes diluted with water, shaken out with chloroform, and evaporated in a vacuum. The residue yields after crystallization from chloroform-ether 570 mg. 2'-mono-(ethoxy-acetyl)-acovenoside A; M.P. 202–204° C.

EXAMPLE 6

2 g. acovenoside A in 20 ml. pyridine were reacted with 1.3 g. α-ethoxy-propionic acid and 4.5 g. p-toluene-sulphochloride in 40 ml. pyridine by the method described in Example 3 and then worked up in the same manner. After crystallization from chloroform-ether-petroleum ether, there were obtained 1.28 g. 2',4'-di-(α-ethoxy-propionyl)-acovenoside A having a melting point of 97–99° C.

EXAMPLE 7

2 g. acovenoside A in 20 ml. pyridine were reacted with 1.75 g. n-propoxy-acetic acid and 6 g. p-toluene-sulpho-chloride in 40 ml. pyridine by the method described in Example 3 and then worked up in the same manner. After recrystallization from chloroform-ether-petroleum ether, there were obtained 1.32 g. 2',4'-di-(n-propoxy-acetyl)-acovenoside A having a melting point of 88–90° C.

EXAMPLE 8

2 g. acovenoside A in 20 ml. pyridine were reacted with 1.2 g. α-n-propoxy-propionic acid and 4 g. p-toluene-sulphochloride in 40 ml. pyridine in the manner described in Example 3 and then worked up in the same manner. Following recrystallization from chloroform-ether-petroleum ether, there were recovered 1.32 g. 2'-mono-(α-n-propoxy-propionyl)-acovenoside A having a melting point of 95–97° C.

EXAMPLE 9

2 g. acovenoside A in 20 ml. pyridine were reacted with 900 mg. phenoxy-acetic acid and 3 g. p-toluene-sulphochloride in 30 ml. pyridine in the manner described in Example 3 and then worked up in the same manner. After crystallization from chloroform-ether-petroleum ether, there were obtained 1.16 g. 2'-mono-(phenoxy-acetyl)-acovenoside A having a melting point of 120–122° C.

In an analogous manner there are obtained 2'-mono-(α-ethoxy-butyryl)-acovenoside A (M.P. 105–107° C.), 2'-mono-(α-chloropropionyl)-acovenoside A (M.P. 122–125° C.), 2'-mono-(α-ethoxy-propionyl)-acovenoside A (M.P. 104–106° C.), 2'-mono-(β-ethoxy-propionyl)-acovenoside A (M.P. 73–75° C.) and 2'-mono-(α-allyloxy-propionyl)-acovenoside A (M.P. 103–105° C.).

EXAMPLE 10

2 g. acovenoside A were dissolved in 30 ml. dimethyl formamide. 2 ml. triethylamine and 10 ml. acetic anhydride were then added to the resulting solution. The reaction mixture was left to stand at room temperature for 4 hours. Thereafter, it was diluted with ten times the amount of water, extracted with chloroform, and the chloroform phase washed twice with water, dried over anhydrous sodium sulphate and evaporated. The crude product contained 2'-monoacetyl-acovenoside A, as well as 2',4'-diactyl-acovenoside A, which were separated by multiplicative distribution with the phase mixture benzene-ethyl acetate-methanol-water (8:1:6:3). The methanol-water phase yielded, after extracting with chloroform and crystallization from chloroform-ether, 1.0 g. 2'-monoacetyl-acovenoside A having a melting point of 150–152° C. From the benzene-ethyl acetate phase, there were obtained, by evaporation and recrystallization from acetone-ether, 0.9 g. 2',4'-diacetyl-acovenoside A having a melting point of 222–224° C.

EXAMPLE 11

2 g. acovenoside A were dissolved in 24 ml. pyridine and 16 ml. propionic anhydride. The resulting reaction mixture was left to stand for 4 hours at room temperature. Thereafter, it was diluted with water, extracted with chloroform, evaporated and fractioned with benzene-ethyl acetate over silica gel. Following crystallization from chloroform-ether, there were obtained 900 mg. 2'-monopropionyl-acovenoside A having a melting point of 171–175° C.

EXAMPLE 12

2 g. acovenoside A were dissolved in 24 ml. pyridine and 16 ml. propionic anhydride. The reaction mixture was left to stand at room temperature for 24 hours. Thereafter, ligroin was added and the precipitated crude product fractioned with benzene-ethyl acetate (2–20%) over silica gel. After recrystallization from chloroform-ether, there were obtained 1.1 g. 2',4'-dipropionyl-acovenoside A having a melting point of 180–184° C.

EXAMPLE 13

2 g. acovenoside A were dissolved in 24 ml. pyridine and 16 ml. butyric anhydride. The reaction mixture was left to stand at room temperature for 24 hours. Thereafter, ligroin was added to the resulting reaction mixture and the precipitated crude product fractioned with benzene-ethyl acetate (4–50%) over silica gel. The benzene fractions which contained 8% acetic ester, yielded, after crystallization from chloroform-ether, 640 mg. dibutyryl-acovenoside A having a melting point of 156–158° C. 580 mg. 2'-monobutyryl-acovenoside A having a melting point of 169–172° C. there were obtained from the benzene+50% ethyl acetate fractions after crystallization from chloroform-ether.

EXAMPLE 14

1 g. acovenoside A was dissolved in 25 ml. methyl dichloroacetate and heated for 16 hours at 90° C. Thereafter, the reaction mixture was concentrated in vacuo, precipitated with ligroin and fractioned with benzene-ethyl acetate (5–30%) over silica gel. The benzene+20% ethyl acetate fractions yielded, after crystallization from chloroform-petroleum ether, 460 mg. 2'-mono-(dichloroacetyl)-acovenoside A having a melting point of 209–213° C.

The present invention also includes within its scope pharmaceutical compositions which comprise one or more of the compounds of general Formula I in admixture with a solid or liquid pharmaceutical carrier. The compounds of the invention are preferably compounded as compositions suitable for oral or rectal administration.

Instances of preparations comprising solid compositions which are intended for oral administration include compressed tablets, pills, dispersible powders and granules. In such solid compositions, one or more of the compounds of Formula I is or are mixed with at least one inert diluent, such as calcium carbonate, potato starch, alginic acid, agar-agar or lactose. Anhydrous sodium sulphate can also be added to protect the acyl radicals in the active materials from saponification by action of atmospheric moisture. The compositions may also include conventional additives in addition to the inert diluents, as, for example, such additives as lubricating agents, such as magnesium stearate, taste improving agents, colorants, etc.

The compositions according to the present invention in a form suitable for oral administration can be prepared as capsules of absorbable material, such as gelatine, containing one or more of the compounds of Formula I, with or without the addition of any diluents and excipients.

The percentage of active ingredient in the compositions according to the present invention may be varied, it being necessary that it should constitute a proportion such that a suitable dosage for the desired therapeutic effect should be obtained. Obviously, several unit dosage forms may be administered at about the same time. In clinical trials, it has been found that a daily dosage of 1–10 mg. suffices, most patients responding favorably to a daily dosage of 1–5 mg. When said daily dosages are administered to decompensated cardiac patients, a clear improvement in the circulatory condition and in the reduction of edema are observed.

The following examples illustrate pharmaceutical compositions according to the present invention.

EXAMPLE 15

Tablets were prepared containing:

| | Mg. |
|---|---|
| 2',4'-diacetyl-acovenoside A | 0.2 |
| Anhydrous sodium sulphate | 10.8 |
| Lactose | 57.0 |
| Starch | 57.0 |
| Talc | 0.7 |
| Agar-agar | 4.0 |
| Magnesium stearate | 1.0 |
| Citric acid | 1.3 |

EXAMPLE 16

Tablets were prepared containing:

| | Mg. |
|---|---|
| 2',4'-diacetyl-acovenoside A | 1.0 |
| Anhydrous sodium sulphate | 10.0 |
| Lactose | 57.0 |
| Starch | 57.0 |
| Talc | 0.7 |
| Agar-agar | 4.0 |
| Magnesium stearate | 1.0 |
| Citric acid | 1.3 |

EXAMPLE 17

A mixture was prepared consisting of:

| | Mg. |
|---|---|
| 2',4'-diacetyl-acovenoside A | 1.0 |
| Ground nut oil | 100.0 |
| Hydrogenated vegetable oil | 10.0 |
| Soya bean lecithin | 3.0 |

This mixture was used for filling a Scherer capsule.

In order to establish that the esterfication of the not readily resorbable acovenoside A results in more readily resorbable products, the derivatives of acovenoside A were evaluated according to the following procedures: Electrocardiographs of guinea pigs maintained under urethane narcosis were observed via an oscilloscope. 5 mg./kg. of test compound were administered in 10 ml./kg. of 5% dimethylacetamide intraduodenally and the time for heart stoppage determined. If the animal was still alive after two hours, then the experiment was discontinued.

Via the intravenous continuous infusion route, the lethal dose of acovenoside A in guinea pigs amounts to 0.48 mg./kg. When ten times that dose was administered intraduodenally, only 3 of 6 animals died. The relative enteral activity of acovenoside A amounts at the highest to 10%. When diacetyl-acovenoside A (Example 10 of application) was administered, 5 mg./kg. intraduodenally was inactive, and only when a dosage of 10 mg./kg. was given did the animals respond as above set out, and then only after 17 minutes.

The activity of the esters of the invention can be seen from the table, which follows:

INTRADUODENAL ACTIVITY

[5 mg./kg. in guinea pigs]

| Test substance | Corresponding example number | Deaths | Time in minutes |
|---|---|---|---|
| Mono-p-chlorobenzoyl-A | 1 | 6/6 | 24 |
| Diformyl-A | 2 | 5/6 | 16 |
| Di-α-chloropropionyl-A | 3 | 3/6 | 23 |
| 2'-Mono-α,-α-dichloropropionyl-A | 4 | 5/6 | 14 |
| Di-ethoxy-acetyl-A | 5 | 5/6 | 19 |
| Di-α-ethoxy-propionyl-A | 6 | 5/6 | 16 |
| Di-n-propoxy-acetyl-A | 7 | 5/6 | 17 |
| Mono-α-n-propoxy-propionyl-A | 8 | 5/6 | 16 |
| Mono-phenoxyacetyl-A | 9 | 5/6 | 17 |
| Monopropionyl-A | 11 | 6/6 | 20 |
| Dipropionyl-A | 12 | 12/12 | 12 |
| Monobutyryl-A | 13 | 5/5 | 10 |

We claim:
1. An acovenoside A derivative of the formula:

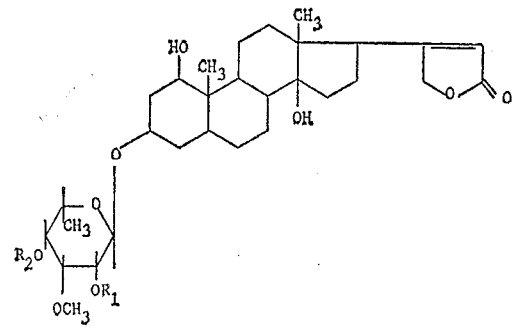

wherein $R_1$ and $R_2$ are each a member selected from the group consisting of hydrogen, unsubstituted and substituted acyl containing 1–7 carbon atoms wherein said substituent is selected from the group consisting of chlorine, lower alkoxy, allyloxy and phenoxy, with the proviso that only one of $R_1$ and $R_2$ is hydrogen and $R_2$ and $R_2$ are not both acetyl.

2. The compound according to claim 1 designated 2′-mono-(p-chlorobenzoyl)-acovenoside A.

3. The compound according to claim 1 designated 2′,4′-diformyl-acovenoside A.

4. The compound according to claim 1 designated 2′,4′-di-(α-chloropropionyl)-acovenoside A.

5. The compound according to claim 1 designated 2′-mono-(α,α-dichloropropionyl)-acovenoside A.

6. The compound according to claim 1 designated 2′,4′-di-(ethoxy-acetyl)-acovenoside A.

7. The compound according to claim 1 designated 2′,4′-di-(α-ethoxy-propionyl)-acovenoside A.

8. The compound according to claim 1 designated 2′,4′-di-(n-propoxy-acetyl)-acovenoside A.

9. The compound according to claim 1 designated 2′-mono-(α-n-propoxy-propyl)-acovenoside A.

10. The compound according to claim 1 designated 2′-mono-(phenoxy-acetyl)-acovenoside A.

11. The compound according to claim 1 designated 2′-monopropionyl-acovenoside A.

12. The compound according to claim 1 designated 2′,4′-dipropionyl-acovenoside A.

13. The compound according to claim 1 designated 2′-monobutyryl-acovenoside A.

14. The compound according to claim 1 designated 2′-mono-(dichloroacetyl)-acevenoside A.

15. A therapeutic composition comprising at least one compound of the formula

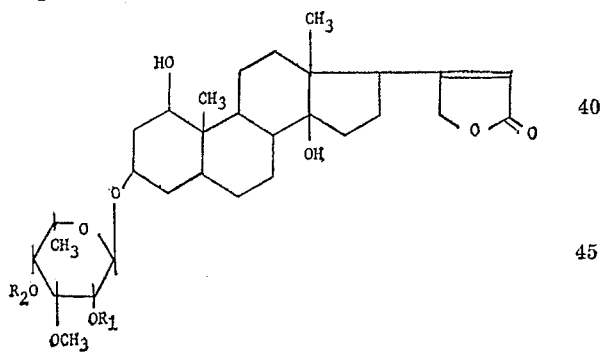

wherein $R_1$ and $R_2$ are each a member selected from the group consisting of hydrogen, unsubstituted and substituted acyl containing 1–7 carbon atoms wherein said substituent is selected from the group consisting of halogen, alkoxy, alkenoxy and aryloxy in admixture with a pharmaceutical carrier.

16. A therapeutic composition according to claim 15 in dosage unit form.

17. A therapeutic composition according to claim 16 in dosage unit form suitable for oral or rectal administration containing 0.1 to 10 mg. per dosage unit.

18. The method of treating cardiac decompensation in mammals which comprises administering to the afflicted mammal an effective amount of from 1 to 10 mg. of a composition according to claim 15.

19. The method of treating cardiac decompensation in mammals which comprises administering to the afflicted mammal an effective amount of from 1 to 10 mg. of a composition according to claim 15.

20. The method of treating cardiac decomposition in mammals which comprises administering to the afflicted mammal an effective amount of from 1 to 5 mg. of a composition according to claim 15.

21. The method of claim 18 wherein said composition is in dosage unit form suitable for oral or rectal administration.

References Cited

Hauschild-Rogat: "Chem. Abst.," vol. 58, 1963, pp. 10291–92.

LEWIS GOTTS, Primary Examiner

J. R. BROWN, Assistant Examiner

U.S. Cl. X.R.

260—210.5

PO-1050
(5/69)

UNITED STATES PATENT OFFICE
CERTIFICATE OF CORRECTION

Patent No. 3,458,628                    Dated   July 29, 1969

Inventor(s) Fritz Kaiser, Wolfgang Schaumann, Wolfgang Voigtlander

It is certified that error appears in the above-identified patent and that said Letters Patent are hereby corrected as shown below:

Col. 1, line 3, "Hesse" should be --Hessen--.

line 5, "Hesse" should be --Hessen--.

line 9, "6,278/66" should be --6,274/66 --; also the second priority has not been listed "39549/66, September 5, 1966".

Col. 2, line 31, "strophantin" should be --strophanthin--.

line 33, "$C_2$-hydroxyl" should be --$C_1$-hydroxyl--.

line 59, "chromatagraphic" should be --chromatographic-

Col. 3, line 50, "created" should be --reacted--.

Col. 7, line 5, "$R_2$" should have been "$R_1$".

Col. 8, line 14 (claim 18) "1" should be --0.1--.

line 20 (claim 20) "decomposition" should be --decompensation--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents